(12) United States Patent
Chen

(10) Patent No.: US 6,926,095 B2
(45) Date of Patent: Aug. 9, 2005

(54) POWER TOOL TRANSMISSION DEVICE

(75) Inventor: Ting-Kuang Chen, Keelung (TW)

(73) Assignee: Power Network Industry Co., Ltd., Taoyuan (TW)

( * ) Notice: Subject to any disclaimer, the term of this patent is extended or adjusted under 35 U.S.C. 154(b) by 3 days.

(21) Appl. No.: 10/637,526

(22) Filed: Aug. 11, 2003

(65) Prior Publication Data
US 2005/0034882 A1 Feb. 17, 2005

(51) Int. Cl.[7] ............................................. B25D 11/00
(52) U.S. Cl. ...................... 173/48; 173/93.5; 173/114; 173/178; 173/216
(58) Field of Search ........................... 173/48, 178, 93, 173/93.5, 114, 216

(56) References Cited

U.S. PATENT DOCUMENTS

| 4,434,859 | A | * | 3/1984 | Rumpp et al. ................ 173/48 |
| 5,375,665 | A | * | 12/1994 | Fanchang et al. ............. 173/48 |
| 5,451,127 | A | * | 9/1995 | Chung ........................ 408/20 |
| 5,531,278 | A | * | 7/1996 | Lin ............................. 173/176 |
| 6,045,303 | A | | 4/2000 | Chung ........................ 408/124 |
| 6,142,242 | A | * | 11/2000 | Okumura et al. ............. 173/48 |
| 6,152,242 | A | * | 11/2000 | Chung ........................ 173/48 |
| 6,202,759 | B1 | * | 3/2001 | Chen ........................... 173/48 |
| 6,688,406 | B1 | * | 2/2004 | Wu et al. ..................... 173/48 |
| 6,729,812 | B2 | * | 5/2004 | Yaksich et al. ............. 408/240 |

FOREIGN PATENT DOCUMENTS

EP 0613758 6/1996 ........... B25B 23/14

* cited by examiner

Primary Examiner—Eugene Kim
Assistant Examiner—Paul Durand
(74) Attorney, Agent, or Firm—Rabin & Berdo, P.C.

(57) ABSTRACT

A power tool transmission device includes a base, a switch portion, a vibration member, a press portion, a transmission shaft and a casing. When the projections press the position plates, bosses on the position plates engage ribs formed outside the outer ring so as to limit the rotation of the outer ring and when the first gear and the second gear are intermittently disengaged with each other, a vibration effect is provided to the transmission shaft.

3 Claims, 3 Drawing Sheets

POWER TOOL TRANSMISSION DEVICE

BACKGROUND OF THE INVENTION

1. Field of the Invention

The present invention relates to a power tool transmission device, and more particularly to a transmission device that is able to limit the rotation ability of the ratchet via a positioning plate to allow the power tool to have intermittent vibration.

2. Description of Related Art

A conventional power tool has the ability to vibrate for breaking through a wall and the ability to rotate for unscrewing a bolt. Normally, this kind of power tool has a switch to shift between different speeds and usually, the maximum speed of the power tool is able to provide not only the rotation ability, but also the vibration ability. However, in order to accomplish the foregoing objective, the transmission device of the conventional power tool is extremely complicated and complex.

Furthermore, the conventional power tool bit does not provide the ability to rotate clockwisely while having the vibration ability in the same time and the ability to rotate counterclockwisely without the ability to vibrate.

Still further, no safety device is provided when the power tool is not in the vibration mode so that operator is easily hurt using the power tool.

To overcome the shortcomings, the present invention tends to provide an improved power tool transmission device to mitigate the aforementioned problems.

SUMMARY OF THE INVENTION

The primary objective of the present invention is to provide an improved power tool transmission device having a base, a switch portion, a vibration member, a press portion, a transmission shaft and a casing, wherein a driving force is transmitted to the transmission shaft to drive a tool on a free end of the transmission shaft to perform a cutting or vibrating function.

Another objective of the present invention is to provide an ability to allow the transmission shaft to rotate clockwisely and to vibrate in a longitudinal direction simultaneously.

Still another objective of the present invention is that when the transmission shaft is rotating counterclockwisely, the transmission shaft will not vibrate so that debris from the cutting action of the transmission shaft is able to be retracted.

Yet another objective of the present invention is that when the power tool is not in the vibration gear, a safety device is activated such that no matter the transmission shaft is rotating clockwisely or counterclockwisely, vibration function is locked to avoid damage to the operator.

Other objects, advantages and novel features of the invention will become more apparent from the following detailed description when taken in conjunction with the accompanying drawings, in which:

DETAILED DESCRIPTION OF THE PREFERRED EMBODIMENT

Figure 1:
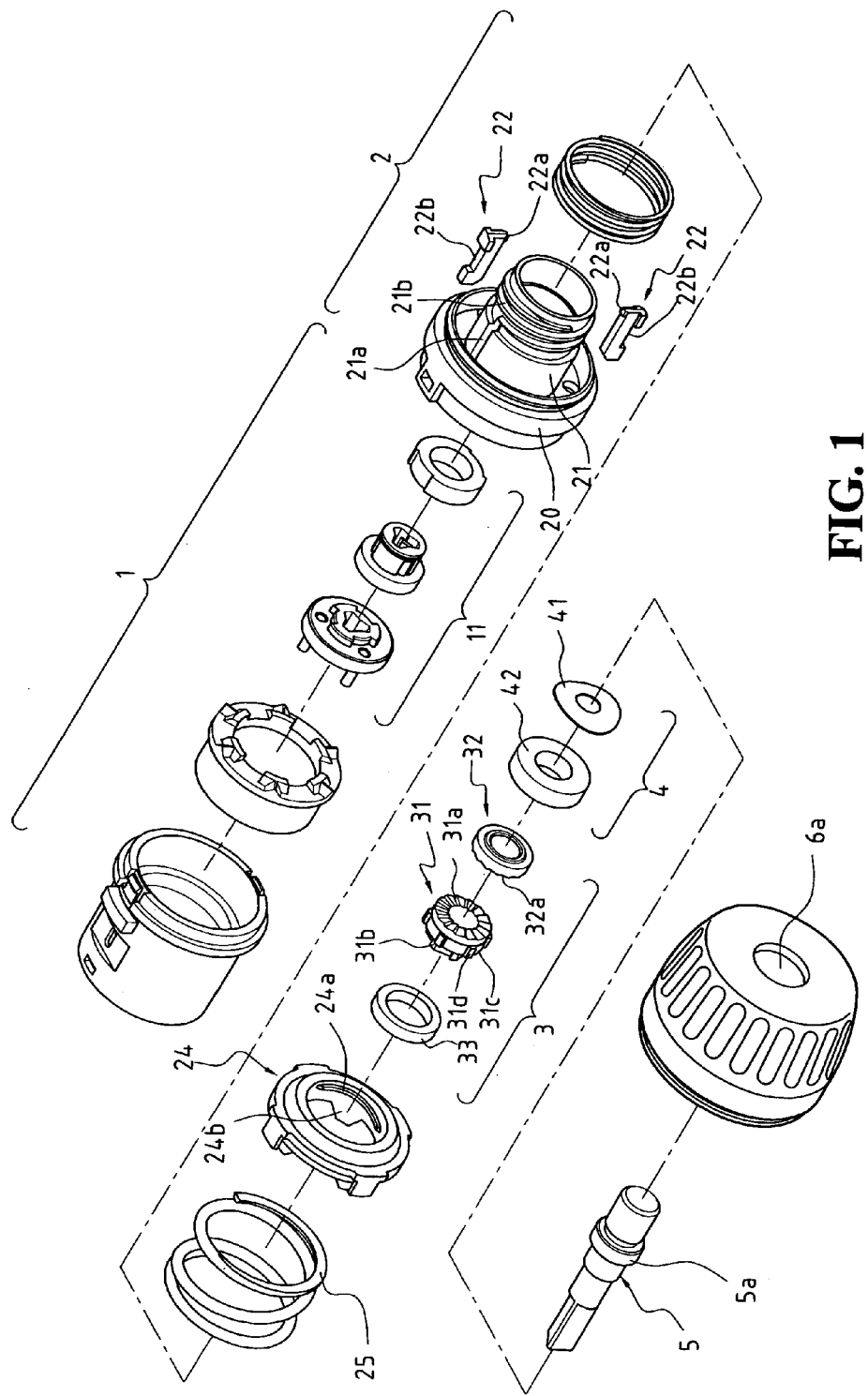
FIG. 1 is an exploded perspective view of a transmission device constructed in accordance with the present invention.
Figure 2:
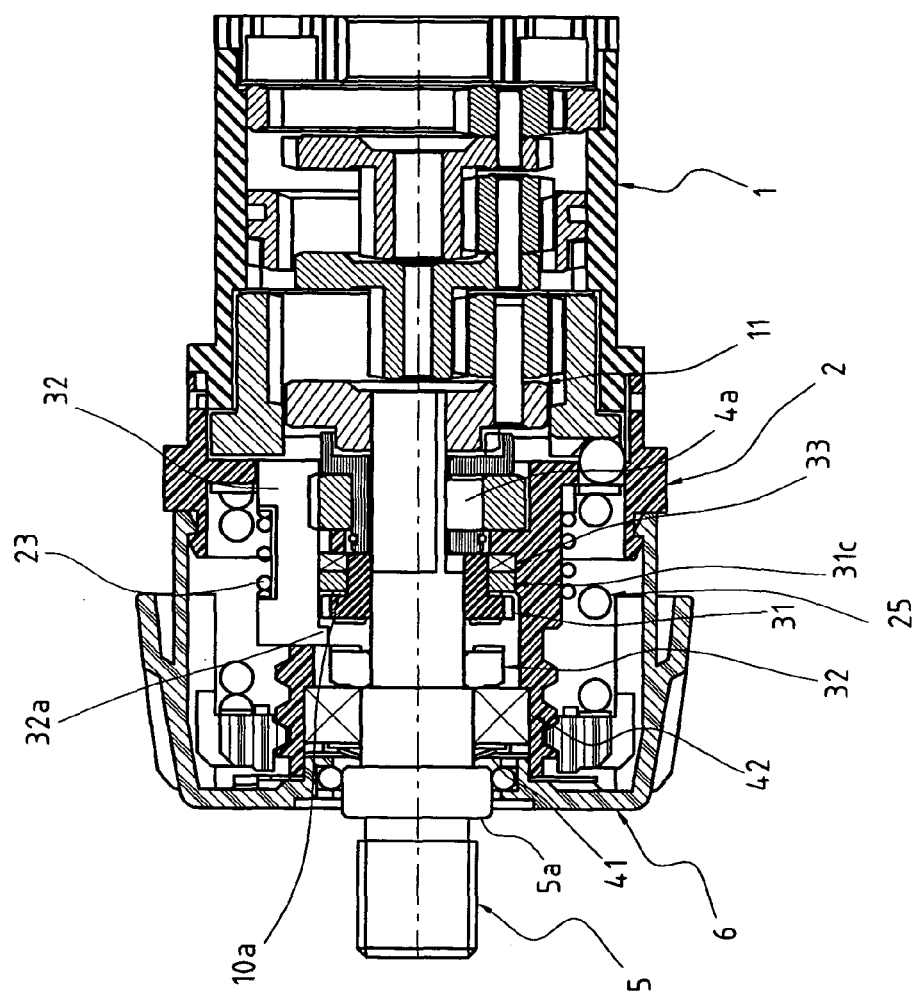
FIG. 2 is a schematic side plan view in cross section showing the internal structure of the present invention in assembled condition.
Figure 3:
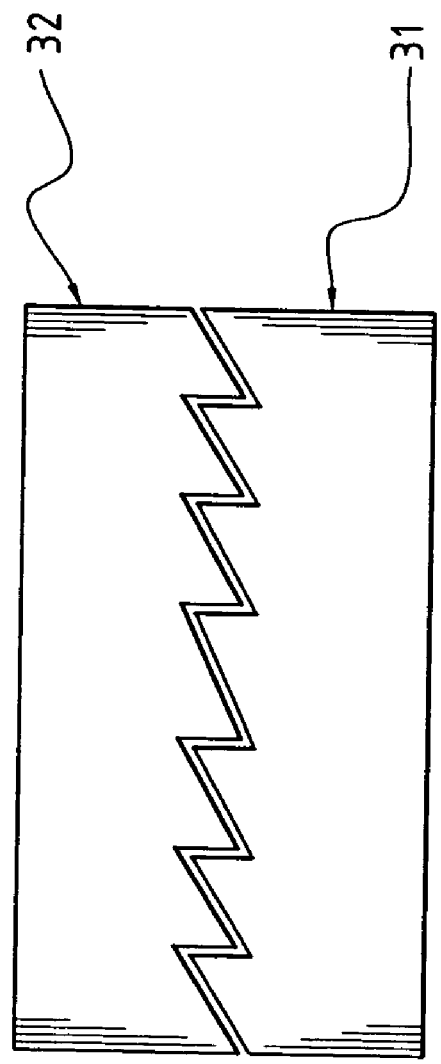
FIG. 3 is a schematic side view showing the relative position between the position wheel and the driving wheel.

With reference to FIGS. 1, 2 and 3, a transmission device in accordance with the present invention includes a base 1, a switch portion 2, a vibration member 3, a press portion 4, a transmission shaft 5 and a casing 6.

The base 1 functions as a driving device. One end of the base 1 is adapted to connect to a bottom face of the switch portion 2 and has an input wheel 11.

The switch portion 2 includes a cylindrical switch seat 21 extending out from a bottom disk 20 which is securely connected to the base 1. The switch seat 21 has multiple slots 21*a* defined from a bottom of the switch seat 21 and extending through a side face of the switch seat 21 and a threading 21*b* formed on a top portion of the switch seat 21. Each of the slots 21*a* is inserted with a position plate 22 having a boss 22*a* formed on one side of the position plate 22 and a recessed area 22*b* opposite to that of the boss 22*a*. With the provision of the recessed areas 22*b* of the position plates 22 in the slots 21*a*, a spring 23 is able to be mounted around the recessed area 22*b* to allow the position plates 22 to be movable in the slots 21*a*. A sleeve 24 is annular in shape and has an inner threading 24*a* formed to correspond to the threading 21*b* of the switch seat 21 and projections 24*b* extending from a peripheral edge of the sleeve 24 to correspond to the positions of the position plate 22. A second spring 25 is mounted between a top face of the bottom disk 20 and a bottom face of the sleeve 24 to provide resilience to the sleeve 24.

The vibration member 3 includes a position wheel 31, a driving wheel 32 and a first ring 33. The position wheel 31 has a first gear 31*a* divergently extending out from a top face of the position wheel 31 and a ratchet 31*b* formed on a bottom face of the position wheel 31. The ratchet 31*b* has an outer ring 31*c* formed outside the ratchet 31 and rotatable relative to the position wheel 31 in a specific direction. The outer ring 31*c* has ribs 31*d* extending out of the outer ring 31*c*. The driving wheel 32 has a second gear 32*a* corresponding to and mated with the first gear 31*a*.

The press portion 4 is composed of a pre-bent, resilient pad 41 and a second ring 42.

The transmission shaft 5 has a flange 5*a* formed on the transmission shaft 5. One end of the transmission shaft 5 is extended through a center of the press portion 4, the vibration member 3 and the switch portion 2 to connect to the input wheel 11 of the base 1 so as to be driven by the input wheel 11. The other end of the transmission shaft 5 is adapted to connect to different auxiliary tools. Besides, the driving wheel 32 is securely mounted in the transmission shaft 5.

The casing 6 is a hollow cylinder having a closed end and an open end. The closed end is equipped with a through hole 6*a* defined through a center of the closed end. The open end of the casing 6 is able to be mounted outside the sleeve 24 to allow the transmission shaft 5 to extend through the through hole 6*a* and is limited by the flange 5*a* and a peripheral edge defining the through hole 6*a* such that rotation of the casing 6 is able to drive the sleeve 24 to rotate as well.

The switch portion 2 is able to change the power tool speed. When the sleeve 24 is rotated to place the power tool in a speed which is not the last speed, the transmission shaft 5 will be influenced by the resilient pad 41 and the projections 24*b* of the sleeve 24 will not press the bosses 22*a* of the position plates 22 such that rotation of the outer ring 31*c* of the position wheel 31 is not limited. Therefore, when the power tool is in a process of cutting, when the free end of the transmission shaft 5 is experiencing a resistance, for example, the power tool is breaking against the wall, although the flange 5a is providing a longitudinal force on the resilient pad 41 to drive the driving wheel 32 to move backward to allow the first gear 31a to mate with the second gear 32a, the outer ring 31c of the position wheel 31 is able to rotate longitudinally so that no matter in what direction the transmission shaft 5 rotates, the ratchet 31b of the position wheel will not rotate and the first and second gear 31a,32a are mated without separation.

On the other hand, when the power tool is in the last speed and when the transmission shaft 5 is experiencing a resistance, the flange 5a is acting on the resilient pad 41 to allow the projections 24b of the sleeve 24 to press on the bosses 22a of the position plate 22 such that rotation of the outer ring 31c of the position wheel 31 is limited and thus the ratchet 31b of the position wheel 31 functions. Therefore, when the power tool is in the process of cutting and the transmission shaft 5 is rotating counterclockwisely, the position wheel 31 will be driven by the driving wheel 32 and there will be no separation between the position wheel 31 and the driving wheel 32. When the transmission shaft 5 is rotating clockwisely, the position wheel 31 will be limited by the already fixed ratchet 31b and is not able to rotate and thus the mutually mated first gear 31a and the second gear 32a will be forced to separate intermittently whereby the transmission shaft 5 is able to provide a vibration effect to the object to be destroyed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. In a power tool transmission device including a base, a switch portion, a vibration member, a press portion, a transmission shaft and a casing, wherein a driving force is transmitted via the base to drive a free end of the transmission shaft to drive an auxiliary tool mountable on the free end of the transmission shaft, the improvement wherein:

the switch portion includes a sleeve securely mounted on a switch seat and including projections formed on a bottom of the sleeve to control position plates slidably mounted in the switch seat;

the vibration member includes a position wheel and a driving wheel, the position wheel is securely mounted on the transmission shaft and includes a first ratchet gear disposed on a top face of the position wheel and an outer ring being disposed on a bottom face of the position wheel, wherein rotation of the outer ring is alternatively limited by positions of the position plates, and the driving wheel includes a second ratchet gear formed to correspond to and alternatively mated with the first ratchet gear, wherein when the projections press the position plates, bosses on the position plates engage ribs formed on an outside of the outer ring so as to limit the rotation of the outer ring and when the first ratchet gear and the second ratchet gear are intermittently disengaged with each other, and a vibration effect is provided to the transmission shaft.

2. The power tool transmission device as claimed in claim 1, wherein the switch portion is able to change speed of the power tool.

3. The power tool transmission device as claimed in claim 1, wherein the switch portion is able to change speed of the power tool and is provided with a vibration gear.

* * * * *